United States Patent

[11] 3,590,377

| [72] | Inventor | Gunther U. Sorger<br>Bethesda, Md. |
|---|---|---|
| [21] | Appl. No. | 748,770 |
| [22] | Filed | July 30, 1968 |
| [45] | Patented | June 29, 1971 |
| [73] | Assignee | Weinschel Engineering Co., Inc.<br>Gaithersburg, Md. |

[54] TEST FIXTURE EMPLOYING AUTOMATIC QUICK CONNECT-DISCONNECT ASSEMBLY FOR MICROWAVE COAXIAL CONNECTIONS
3 Claims, 3 Drawing Figs.

[52] U.S. Cl. ................................................. 324/158,
339/65
[51] Int. Cl. ............................................. G01r 31/00,
H01r 13/20
[50] Field of Search ........................................ 324/158 F,
72.5; 339/6.5, 66

[56] References Cited
UNITED STATES PATENTS

| 2,939,102 | 5/1960 | Johnson | 339/66 X |
| 2,954,521 | 9/1960 | McKee | 324/72.5 |
| 2,981,919 | 4/1961 | Lamont | 324/158 UX |
| 3,091,748 | 5/1963 | Takes | 339/65 |

*Primary Examiner*—Rudolph V. Rolinec
*Assistant Examiner*—Ernest F. Karlsen
*Attorney*—Max L. Libman ABSTRACT: A test fixture for microwave units featuring a contact assembly for rapidly and simultaneously engaging a plurality of coaxial connectors of a unit to be production-tested, the assembly having funnel-shaped guides for accurately centering the test circuit contacts with those under test, and pneumatic or other power drive means for firmly engaging the contacts without the necessity for manually tightening down coupling nuts or bayonet fasteners.

INVENTOR
Gunther U. Sorger
BY Max L. Libman
ATTORNEY

INVENTOR
Gunther U. Sorger

BY Max L. Libman
ATTORNEY

TEST FIXTURE EMPLOYING AUTOMATIC QUICK CONNECT-DISCONNECT ASSEMBLY FOR MICROWAVE COAXIAL CONNECTIONS

BACKGROUND OF THE INVENTION

In automatic microwave measuring systems, it is required to measure parameters such as the insertion loss and the reflection coefficient, automatically, but also it must be possible to insert items under test into the test circuit in such a way that the repeatability of the measurement for the insertion loss and reflection coefficient, for example, is independent of the operator, so that a relatively unskilled operator can use the equipment under the requirements of very stringent specifications. Furthermore, it must be possible to test units relatively quickly as a production procedure, since the cost of testing precision microwave units is an important factor in the ultimate cost of the finished unit. Most microwave connector units are provided with screw-type or bayonet-type fastening elements for firmly engaging the respective male and female members of a connector, and the manipulation of these units is time consuming, but is ordinarily essential to insure a proper connection.

SUMMARY OF THE INVENTION

The present invention provides a quick connect-disconnect arrangement which meets the above requirements, and furthermore, it can be used for any coaxial connector (e.g., screw type of bayonet locking nut), such as Type N, BNC, TNC, or OSM, and so forth.

The principle of the invention is as follows: The coaxial item under test (e.g., an attenuator) will have connectors to which connections must be made for testing, for example, for insertion loss measurement. The generator portion of the microwave test stand must be connected to the input and the load portion of the stand connected to the output. The problem is that the unit under test has a certain mechanical tolerance and so has the location of the connector, and therefore provision must be made for the accurate mating of connectors which may not be in accurate alignment. A quick assembly connector must therefore seek a location of the connector to which it is to be engaged, and must engage with good repeatability (e.g., 0.02 db.). The apparatus described below can meet these requirements up to 8 GHz. and without requiring the coupling mechanism to engage by further tightening of the connector using the coupling nut, which is important where rapid operation is required for large-quantity production testing. The assembly must have R–F characteristics such as to introduce very little reflection, since this will add to the uncertainty of the measurement. The quick-connector must be able to operate tens of thousands of times without any degradation in performance in order to be suitable for production testing. Furthermore, the apparatus should contain no sliding members in the R–F cable assembly, and in the connection to the stationary part of the testing circuit. Another requirement is that the engagement with the connector should be gentle enough not to harm the unit under test, yet should be firm enough when engaged to obtain the required repeatability.

The specific nature of the invention, as well as other objects and advantages thereof, will clearly appear from a description of a preferred embodiment as shown in the accompanying drawings, in which.

DETAILED DESCRIPTION OF THE INVENTION

Figure 1:
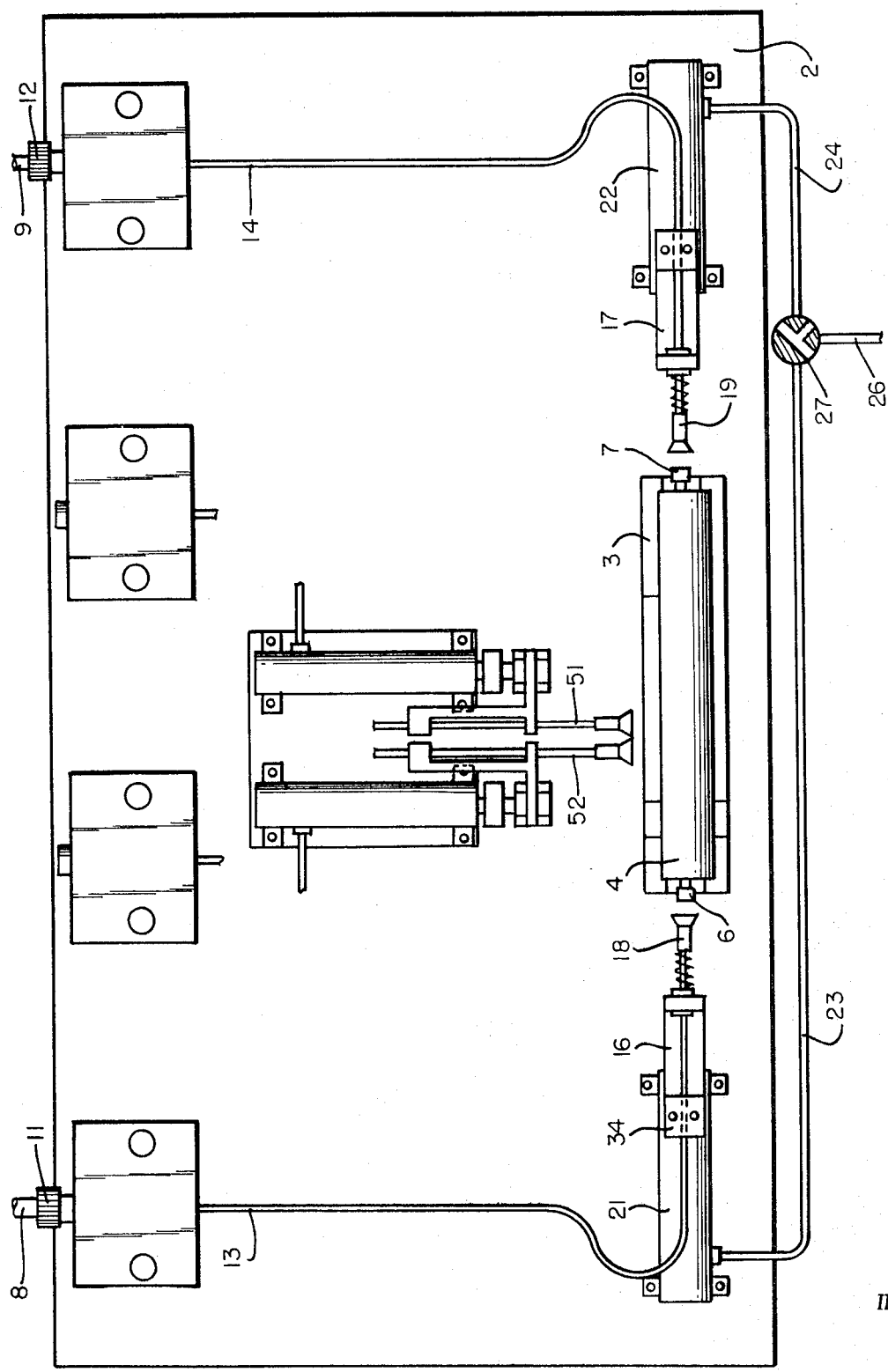
FIG. 1 is a top view of a test fixture according to the invention.

Referring to FIG. 1, a test fixture is shown comprising a panel 2 on which is mounted jig 3 designed to firmly hold the unit under test 4 having at one end a male coaxial connector 6 and at the other end a female connector 7. This is to be connected to the leads of an external test circuit indicated at 8 and 9, which is connected through suitable high-quality coaxial connectors 11 and 12 respectively to coaxial conductors 13 and 14 which may be flexible, but are preferably of a semirigid type, e.g., having a soft copper outer conductor which can be bent without changing the cross section dimensions enough to cause noticeable reflections (i.e., no reflection coefficient change more than 0.01 ), but which is sufficiently stiff to remain in the configuration into which it has been bent. Conductors 13 and 14 are bent into the curved shapes shown, and held near their ends by clamping fixtures 16 and 17 which are movable, as will be described below, so that connectors 18 and 19 respectively mounted on the ends of conductors 13 and 14 can be moved into and out of engagement with connectors 6 and 7 respectively. The semirigid nature of the coaxial conductor 13 and 14 permits them to be moved at their free ends in any direction a sufficient amount to provide for any initial misalignment, as will be described below.

Clamps 16 and 17 are mounted respectively on pneumatic actuators 21 and 22 which are operated by air pressure supplied through pipes 23 and 24 from any suitable air pressure source 26 under control of valve 27, which may be either manually controlled or may be electrically controlled by any known mechanism from a pushbutton or switch mounted on the front of the test fixture.

Figure 2:
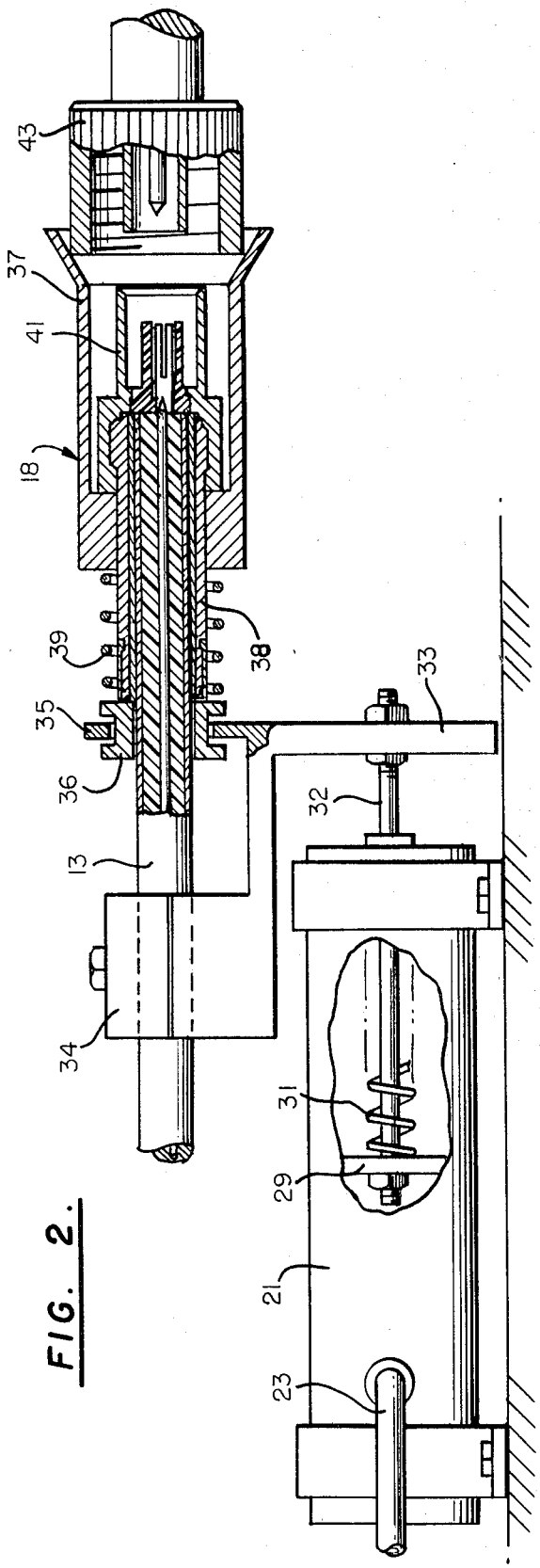
FIG. 2 is a side view, partly in section, of a quick-connect pneumatic unit carrying a female connector.

FIG. 2 shows the pneumatic actuator 21 in greater detail. Air pressure is supplied through hose 23 to move piston 29 to the right as shown, against the action of spring 31, which tends to restore the piston to its original position. Piston rod 32 then carries fixture 33 to the right, and this fixture holds the above-described coaxial conductor 13 by means of clamp 34 and loose collar 36, which is capable of a certain amount of lateral play to provide for misalignment of the contacts which are to be engaged. A funnel-shaped guide 37 is carried on sleeve 38 which is attached to the semirigid cable 35; the funnel guide 37 is slidable on sleeve 38, but it is lightly pressed into the forward position by spring 39. Within the funnel 37, a coaxial cable connector 41 is attached to the end of the coaxial cable 13. In FIG. 2, a female connector is shown suitable for connection to the male connector of a unit under test; in FIG. 3, a male connector is shown suitable for attachment to the female connector of a unit under test.

When the unit under test is inserted in the jig 3, which is designed to position it properly and hold it in substantial alignment with coaxial connectors 18 and 19, air valve 27 is opened, and air pressure is supplied through lines 26 and 23 to the cylinder 21. This causes the piston and hence the connector assembly 18 to move to the right until the funnel 37 engages with the outermost portion of the male connector of the unit under test. Where this is a connector having a screw nut 43, the outer edge of the nut 43 will first be engaged by the sloping portion of the funnel 37, which will center or align the connector 18 due to the loose play between elements 25 and 26, it being understood that the misalignment due to manufacturing tolerances is actually quite small and only a small amount of lateral play is required. The movable connector 18 then continues to move to the right to fully engage the stationary connector, the funnel 37 being pushed back against spring 39 while continuing to retain the two elements in alignment, until the coaxial connector contacts engage in the usual fashion. The advantages of pneumatic pressure for this purpose is that it is reasonably gentle, and yet ensures sufficiently firm pressure to fully engage the coaxial contacts. Electrical driving mechanism can also be employed, but tends to be more sudden and to engage the elements at a higher velocity, with more possibility of damage to the contacts.

After the test has been completed, which may be done in any desired manner, as by an automatic testing routine, the air pressure to the cylinder is cut off, whereupon the spring 31 tends to restore the cylinder to its initial position, thus disengaging the test contacts and leaving the unit under test free to be removed from the jig 3.

Figure 3:
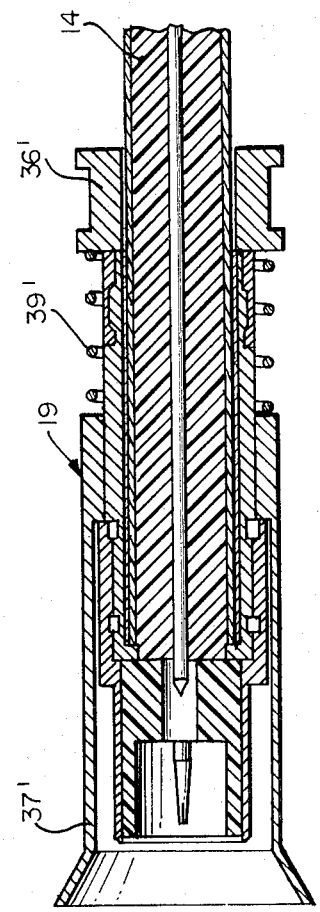
FIG. 3 is a sectional view of a male connector suitable for use with the quick-connect unit.

FIG. 3 shows the test connector arrangement for the male connector 19 shown in FIG. 1, which is similar in principle to the above-described female connector, except for different dimensions required in the case of the male connector. Since the female connector in this case does not carry the large nut 43, the funnel 37' for the male connector can be made smaller than the funnel 37 for the female connector. This has the advantage that two such units as shown in FIGS. 2 and 3 can also be engaged in a similar manner, since the smaller funnel 37' will fit into the larger funnel 37 to center the two units, whereupon further axial motion toward each other will cause engagement in the usual fashion.

One advantage of the pneumatic system shown over an electrical system using solenoids is that the pneumatic cylinder can be very thin, approximately the same order as the contacts which are to be opened and closed. It is therefore possible for connectors to be close together, which is required in the case of some units being tested, which may have a number of contacts side-by-side and fairly closely spaced. This is illustrated in FIG. 1 by units 51 and 52, which are not used for the type of unit shown under test, but which would be used for a different type of unit having two contacts extending laterally therefrom and closely spaced together. In practice, the test fixture will be provided with as many contact-engaging units as required for the type of equipment which is to be tested, and for a number of different types of units. In the case of automatic testing machines, the machine will be programmed for the different types of units, by known types of equipment, which are not a part of the present invention.

I claim:

1. a. A test fixture for microwave units, such as attenuators, having coaxial connector termination means for attachment of the units into a microwave circuit comprising b. a base having thereon connector means for electrical connection to a testing circuit, c. at least one microwave conductor having at least limited flexibility, connected at one end to said fixed connector means and having coaxial test connector termination means at the other end, d. a jig for firmly mounting a test unit on said base, said test unit having a coaxial connector termination capable of connection with said test connector termination means, e. motor means mounted on said base for moving said test connector termination means into engagement with said test unit connector termination, f. funnel-shaped guide means surrounding and carried by said coaxial test connector termination means for guiding and centering said test connector means and said connector termination means into accurate alignment as they are engaged by operation of said motor means, 2. The invention according to claim 1, said fluid pressure motor being a pneumatic motor.

3. The invention according to claim 2, and air valve means on said base for controlling the operation of said pneumatic motor means.